Sept. 8, 1970     L. R. NEWFARMER     3,527,611
STANDING WAVE PIPELINE CLEANING METHOD
Filed Dec. 16, 1968
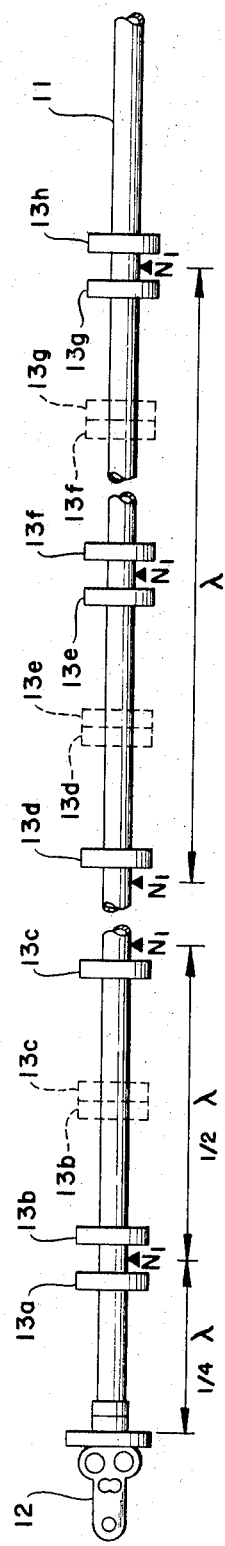
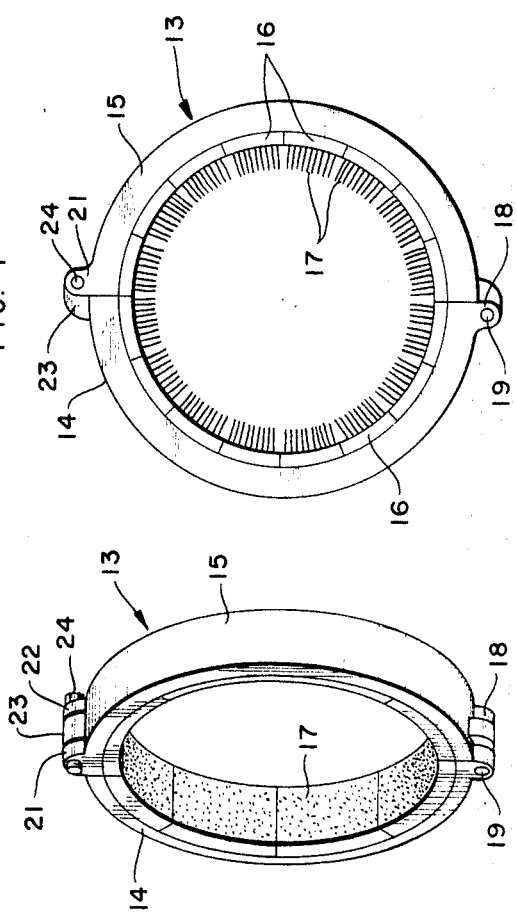
INVENTOR:
L. R. NEWFARMER
BY: Thomas R. Lampe
HIS ATTORNEY United States Patent Office 3,527,611
Patented Sept. 8, 1970

3,527,611
STANDING WAVE PIPELINE CLEANING METHOD
Leo R. Newfarmer, La Jolla, Calif., assignor to Shell Oil Company, New York, N.Y., a corporation of Delaware
Filed Dec. 16, 1968, Ser. No. 783,922
Int. Cl. B08b 1/00, 7/02
U.S. Cl. 134—6      4 Claims

ABSTRACT OF THE DISCLOSURE

A method of cleaning and descaling pipe wherein abrasive collar means is positioned about the pipe and in intimate contact with the outer surface thereof. Longitudinal standing wave vibrations are generated in the pipe, causing movement of said abrasive collar means relative to said pipe.

---

The present invention relates to pipeline-laying operations, and more particularly to a method of cleaning and scouring the outer surface of pipe to prepare for coating with anti-corrosion substances prior to burial of the pipe in the ground.

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products. Improvements in pipeline construction techniques which tend to speed installation thereof, reduce pipeline costs and result in a longer useful pipeline life, are therefore of great economic importance.

The outer surface of metal line pipe, even new pipe, is always to some extent covered with so-called "mill scale"—grease and dirt which must be removed immediately prior to application of the protective covering or coating commonly used in the pipeline art to exclude water, air and other corrosive agents present in the ground from the pipe. One prior art expedient for removing "mill scale" to expose a dry, clean metal surface suitable for bonding by a protective coating is the use of machine-driven wire brushes propelled in rotary fashion about the pipe. Most commonly, such brushes are associated with an assembly which moves slowly along the line as a self-propelled vehicle a short distance ahead of the machines applying the protective outer coating.

This prior art method is less than satisfactory in that it cleans somewhat irregularly; moreover, the machines utilized during such operation are quite large and must move along the whole length of the pipeline under their own power, assisted as necessary by auxiliary prime mover means. Such an approach is often cumbersome in rough country or close-quarter work and on curves and bends.

Additional pipe cleaning techniques have also been utilized. For example, sand-blasting of the pipe by means of machines incorporating rotating jet nozzles has found some degree of acceptance. The machinery used to carry out this method, however, is quite expensive and, if anything, even more cumbersome than that employed to carry out the rotary brush approach. Cleaning of pipe with various kinds of abrasive slurries in a manner similar to that used for metal machine-parts, castings, etc., has been tried, but this technique is an expensive one and it often leaves the pipe wet or coated with undesirable liquid residues and spent abrasives.

SUMMARY OF THE INVENTION

It is therefore a primary object of the present invention to provide an improved pipe cleaning method which may be carried out without the use of cumbersome, expensive equipment.

A further object of the present invention is to provide an improved pipe cleaning method which may readily be carried out in rough country or close-quarter conditions.

A still further object of the present invention is to provide an improved pipe cleaning method wherein the energy expended in the course of carrying out the steps thereof is efficiently expended to ensure uniform cleaning of the pipe outer surface.

These and other objects have been attained in the present invention by providing a method of pipe cleaning wherein a predetermined length of pipeline has standing waves established therealong, such waves cooperating with abrasive collar means positioned about the pipe and in intimate contact with the outer surface thereof, to cause relative movement between the collar means and the pipe to clean and descale the pipe outer surface. According to the method, a given long length of pipe is subjected to force pulses which impart tuned vibration at one of the natural harmonics of that particular length of pipe, thus dividing it dynamically into relatively short half-wave-length intervals of a standing wave such that the pipe's outer surface executes a vigorous back-and-forth scrubbing motion of maximum amplitude at the antinodal positions and diminishing to near zero at nodal points where relatively stationary supports operatively associated therewith are positioned.

DESCRIPTION OF THE DRAWING

The above-noted and other objects of the present invention will be understood from the following description taken with reference to the accompanying drawing. In describing the invention in detail, reference will be made to the drawing in which like reference numerals designate corresponding parts throughout several views in which:

FIG. 1 is a diagrammatic view illustrating a given length of pipeline in operative association with sonic oscillator means and a plurality of scouring collars; and FIGS. 2 and 3 are, respectively, an isometric view and a longitudinal view of a scouring collar which may be utilized in carrying out the teaching of the present invention.

For the proper understanding of the present invention, the underlying acoustic theory involved with respect thereto will be discussed briefly. For a more detailed coverage of the subject acoustic phenomena, reference may be had to U.S. Pat. No. 3,283,833, issued Nov. 8, 1966, to A. G. Bodine, Jr. As is further explained in that patent, a resonant elastic longitudinal standing wave may be created in an elongated member, such as a length of pipe, by means of a vibration generator or oscillator, the latter having an operating frequency which corresponds with the resonant frequency of the elongated member for a mode of elastic wave vibration. Such action will cause the external surface of the pipe along its entire length to participate in forceful, high acceleration cyclic motion back and forth within the elastic limits of its material with greater or lesser amplitude, depending upon the distance from the standing wave nodes.

In FIG. 1 is illustrated a length of pipe 11 having attached thereto at one end thereof a vibration generator or oscillator 12 which may be of any known type. One form of vibration generator suitable for this purpose is disclosed in U.S. Pat. No. 3,054,463, issued Sept. 18, 1962 to A. G. Bodine, Jr. However, other types of vibration generators are capable of use in carrying out the teachings of the present invention. It should be assumed that the length of pipe 11 is shown as being detached from the remainder of the pipeline with which it eventually is to be placed into operative association. In addition, length of pipe 11 should be understood to be in an elevated condition with respect to the remainder of the pipeline to facilitate operations with respect thereto. The pipe 11 will be supported at selected points along its length. The manner in which these points are selected will be described in greater detail below.

Disposed about the pipe 11 are a plurality of abrasive collars 13a–13h. One such collar, indicated generally by means of reference numeral 13, is illustrated in FIGS. 2 and 3. As may be seen most clearly with reference to these latter figures, each abrasive collar includes two outer band sections 14 and 15 which are preferably constructed of steel or other similar metal. Each band section is formed in the shape of a substantially 180° arc so that when they are disposed in the illustrated relative positions they form a closed circle. Disposed about the inner peripheral surfaces of the band sections 14 and 15 are a plurality of brush elements, each including a base member 16 having wire bristles extending therefrom, as at 17. The band sections 14 and 15 are formed at one end thereof in such a manner as to provide a hinge 18. A pin 19 passes through suitable apertures formed in the cooperating portions of the band sections 14 and 15 forming the hinge 18 so that the band sections may freely pivot about the pin 19 in an obvious manner. This arrangement permits the collars to be placed around pipe 11 prior to the pipe cleaning operation. After this has been accomplished, any desired arrangement may be used to lock the collar around the pipe. One such arrangement is shown in FIGS. 2 and 3 wherein band section 15 includes two outwardly-projecting elements 21 and 22 and band section 14 includes a centrally-disposed, outwardly-projecting element 23 adapted to be positioned between elements 21 and 22 when the band sections 14 and 15 are in the illustrated closed position. All of the outwardly-projecting elements define throughbores which are in alignment when the band sections are in the illustrated closed position. A pin 24 is then inserted through the throughbores to ensure that the collar remains closed. However, as stated above, any form of latch or lock means may be utilized for this purpose. The primary consideration, regardless of the type of securing means, is to ensure that the collars are clamped firmly into position on the pipe with the brush element bristles being in firm contact with the outer surface of the pipe about the outer periphery thereof.

The scouring collars are secured to pipe 11 in pairs as indicated in phantom lines in FIG. 1 at intervals of one-half wave length λ for a predetermined frequency, which will be one in the harmonic series for the particular material and length of line pipe segment 11. After the collars have been installed, the length of pipe 11 is excited by means of vibration generator or sonic oscillator 12 at a frequency adjusted by trial and error within a narrow predetermined range, thus generating waves at overtones of the fundamental resonant frequency of the pipe. The external surface of length of pipe 11 will be set into forceful, high acceleration cyclic motion back and forth within the elastic limits of the pipe material with the amplitude of the motion being greatest midway between the nodal points N and decreasing as the distance to the nodes decreases. Since such movement is minimal at nodal points N, these points should be used as placement points for the supports used to maintain the length of pipe 11 in an elevated position during cleaning and scouring operations.

The cyclic motion of the pipe, in combination with the inertia of the scouring collars results in the scouring collars moving bodily along the pipe; for example, from the above-described one-half wave length positions illustrated in phantom lines to the nodal points. During the course of such movements, the outer pipe surface is subjected to intense scouring action by the scouring collar wire bristles 17, thereby removing "mill scale" or other foreign substances from the pipe so that a dry, clean metal surface is exposed which is suitable for bonding by a protective coating.

The oscillating or vibrating motion is continued until the scouring collars come into close proximity to the nodal points as illustrated in FIG. 1. During the course of such vibrating action each scouring collar will have moved along substantially a quarter wave length with the exception of small portions at and near the nodal support points. An acoustic adjustment by any of several means well understood in the sonic art then repositions the nodal points; supports are moved there; collars are relaxed and moved to the unscoured former nodes and vibration is resumed. The previously unscoured and unscaled portions of the line will accordingly be treated to remove the "mill scale" and other foreign substances, thereby resulting in a fully-cleaned length of pipe. The collars are then completely removed from the pipe, the oscillator device is disconnected, and the line segment is coupled onto the line so that the protective outer coating (which may comprise a primer and successive outer coats) is applied.

I claim as my invention:

1. A method of cleaning and descaling the outer surfaces of sections of pipe, said method comprising the steps of:
   supporting said section of pipe to permit free longitudinal standing wave vibration thereof;
   coupling a sonic vibration generator to one end of said section of pipe;
   positioning a plurality of abrasive collars having scouring portions thereon at selected positions along and with the scouring portions in intimate contact with the outer surface of said section of pipe; and
   generating longitudinal standing wave vibrations in said section of pipe thereby causing movement of said collars relative to said pipe.

2. The method of claim 1 wherein said step of generating standing waves in said section of pipe comprises generating said waves at overtones of the fundamental resonant frequency of said section of pipe.

3. The method of claim 2 wherein said step of positioning collars on said section comprises positioning said collars substantially at antinodal points along said section.

4. The method of claim 2 wherein the step of supporting said section comprises supporting section substantially at nodal points.

References Cited
UNITED STATES PATENTS

| | | | |
|---|---|---|---|
| 1,891,820 | 12/1932 | Johnston | 15—104.07 |
| 2,960,706 | 11/1960 | Dunham | 15—104.04 X |
| 2,974,932 | 3/1961 | Xenis | 15—104.05 X |
| 3,139,101 | 6/1964 | Wyczalek | 134—16 X |
| 3,173,034 | 3/1965 | Dickey | 134—1 X |
| 3,409,031 | 11/1968 | Benbow | 134—1 X |
| 3,421,939 | 1/1969 | Jacke | 134—1 |
| 3,446,666 | 5/1969 | Bodine | 134—1 |

JOSEPH SCOVRONEK, Primary Examiner

S. MARANTZ, Assistant Examiner

U.S. Cl. X.R.

15—104.04; 134—1, 16